(12) United States Patent
Heron

(10) Patent No.: US 8,994,747 B2
(45) Date of Patent: Mar. 31, 2015

(54) SUPERIMPOSED DISPLAY OF IMAGE CONTOURS

(75) Inventor: Nicolas Heron, New York, NY (US)

(73) Assignee: Imacor Inc., Garden City, NY (US)

(*) Notice: Subject to any disclaimer, the term of this patent is extended or adjusted under 35 U.S.C. 154(b) by 1104 days.

(21) Appl. No.: 12/267,262

(22) Filed: Nov. 7, 2008

(65) Prior Publication Data

US 2009/0122082 A1    May 14, 2009

Related U.S. Application Data

(60) Provisional application No. 60/986,647, filed on Nov. 9, 2007.

(51) Int. Cl.
*G09G 5/00* (2006.01)
*G06T 7/00* (2006.01)
*G01S 7/52* (2006.01)

(52) U.S. Cl.
CPC .............. *G06T 7/0024* (2013.01); *G06T 7/0012* (2013.01); *G01S 7/52073* (2013.01); *G01S 7/52074* (2013.01); *G06T 2200/24* (2013.01); *G06T 2207/10136* (2013.01); *G06T 2207/30048* (2013.01)
USPC ........... 345/629; 345/419; 345/420; 382/130; 382/131; 382/132; 382/316

(58) Field of Classification Search
CPC ......... G06T 17/20; G06T 19/00; G06T 17/00; G06T 17/10; G06T 17/005
USPC ............................ 345/420; 382/130–132, 316
See application file for complete search history.

(56) References Cited

U.S. PATENT DOCUMENTS

| 4,630,203 | A | * | 12/1986 | Szirtes .......................... 382/132 |
| 4,729,019 | A |   | 3/1988  | Rouvrais ....................... 358/112 |
| 4,817,173 | A | * | 3/1989  | Furukoori ..................... 382/197 |
| 5,072,384 | A |   | 12/1991 | Doi et al. ................. 364/413.13 |
| 5,734,738 | A |   | 3/1998  | Sato .............................. 382/128 |
| 6,028,907 | A | * | 2/2000  | Adler et al. ...................... 378/4 |
| 6,847,383 | B2 |  | 1/2005  | Agnew .......................... 345/660 |

(Continued)

OTHER PUBLICATIONS

MRI-determined left ventricular "crescent effect": a consequence of the slight deviation of contents of the pericardial sack from the constant-volume state, Emily Waters et. al., Am J Physiol Heart Circ Physiol 288: H848-H853, Oct. 14, 2004.

(Continued)

*Primary Examiner* — Xiao M. Wu
*Assistant Examiner* — Todd Buttram
(74) *Attorney, Agent, or Firm* — Proskauer

(57) ABSTRACT

Disclosed are computer-implemented methods, systems, and computer program products for displaying superimposed image contours. A first centroid or center-of-mass of a contour extracted from a first image that depicts a moving object as the object appeared at a first time is calculated. A second centroid or center-of-mass of a second contour extracted from a second image that depicts the object as the object appeared at a second time is also calculated. The second image depicts the object in substantially the same plane as the first image. The first and second contours are displayed with the respective first and second centroids or centers-of-mass positioned at a common location. In some implementations, the images are ultrasound images depicting, for example, a human heart. The images can be transgastric short axis views of the human heart.

4 Claims, 6 Drawing Sheets

(56) References Cited

U.S. PATENT DOCUMENTS

| | | | |
|---|---|---|---|
| 6,859,548 B2 | 2/2005 | Yoshioka et al. | 382/128 |
| 6,867,753 B2 | 3/2005 | Chinthammit et al. | 345/8 |
| 7,103,205 B2 | 9/2006 | Wang et al. | 382/132 |
| 7,313,260 B2 | 12/2007 | Wang et al. | 382/128 |
| 7,374,536 B1 | 5/2008 | Taylor | 600/300 |
| 7,990,414 B2 * | 8/2011 | Karaoguz et al. | 348/135 |
| 2002/0087274 A1 | 7/2002 | Alexander et al. | 702/19 |
| 2003/0046008 A1 | 3/2003 | Wolfson et al. | 702/19 |
| 2003/0108223 A1 | 6/2003 | Prokoski | 382/115 |
| 2004/0122320 A1 * | 6/2004 | Murashita | 600/449 |
| 2005/0197573 A1 * | 9/2005 | Roth et al. | 600/437 |
| 2005/0259882 A1 | 11/2005 | Dewaele | 382/243 |
| 2005/0259891 A1 | 11/2005 | Sendai | 382/294 |
| 2006/0170679 A1 * | 8/2006 | Wang et al. | 345/424 |
| 2006/0171581 A1 | 8/2006 | Blaine | |
| 2007/0160272 A1 * | 7/2007 | Nagamine et al. | 382/128 |
| 2008/0015428 A1 * | 1/2008 | Epstein et al. | 600/410 |
| 2008/0101674 A1 | 5/2008 | Begelman et al. | 382/130 |
| 2008/0181479 A1 * | 7/2008 | Yang et al. | 382/131 |
| 2008/0219530 A1 | 9/2008 | Levanon et al. | 382/130 |
| 2008/0260230 A1 * | 10/2008 | Gotardo et al. | 382/131 |
| 2009/0009512 A1 * | 1/2009 | Dolimier et al. | 345/420 |
| 2009/0231335 A1 * | 9/2009 | Von Berg et al. | 345/420 |
| 2010/0016658 A1 * | 1/2010 | Zou et al. | 600/101 |
| 2010/0040264 A1 * | 2/2010 | Volkau et al. | 382/128 |

OTHER PUBLICATIONS

Search Report and Written Opinion from corresponding application PCT/US2008/082836.

* cited by examiner

SUPERIMPOSED DISPLAY OF IMAGE CONTOURS

CROSS-REFERENCE TO RELATED APPLICATIONS

This application claims the benefit of U.S. Patent Application No. 60/986,647 titled "Superimposed Display of Image Contours," which was filed on Nov. 9, 2007, and the contents of which are hereby incorporated herein by reference.

TECHNICAL FIELD

The description generally relates to image processing and display and more specifically to superimposed displays of image contours.

BACKGROUND

Digital images often contain objects of interest and can be displayed at various resolutions and at various points in time. In addition, digital images often contain noise or less relevant features in various amounts depending on the device used to collect the data associated with the digital image and the level of resolution. In particular, obtaining a digital image using inferential techniques such as radiographic, echographic, or ultrasonic techniques can be especially susceptible to blurring between the object of interest and noise (or less relevant features) due to, e.g., electromagnetic effects. In some applications, an ultrasound technician captures an image using an image capture device that captures still images or sequences of still image frames (e.g., video). The ultrasound technician can annotate the captured image using an input device to mark, for example, landmarks within the image, distances between points in the image, or other features.

In certain circumstances, useful information can be obtained by comparing an image of a moving object captured at one time $t_1$ with an image of the object captured at a different, e.g., later, time $t_2$. For example, the effectiveness of a treatment regimen can be monitored by comparing an ultrasound image of the transgastric short axis view (TGSAV) of a human heart under observation at time $t_1$ with an ultrasound image of the TGSAV of the same heart at time $t_2$. Typically, comparisons between such ultrasound images are facilitated by displaying an image and objects therein at time $t_1$ alongside a second image at time $t_2$ on a single display monitor (e.g., the images are displayed side-by-side).

One drawback to displaying ultrasound images side-by-side is that differences between the images or objects therein can be obscured due to noise or presence of less relevant features in the images. Additionally, side-by-side comparison does not readily facilitate comparison between objects present in each image when the image capture device or the objects may have moved between time $t_1$ and time $t_2$ or when the objects appear out of scale between the images. Moreover, visually comparing two objects from different images in different fields of view can be time consuming for the ultrasound technician or medical or healthcare personnel (e.g., a doctor) seeking to visually assess the efficacy of a course of treatment.

SUMMARY

The concepts described herein address the drawbacks associated with presenting two images side-by-side by displaying information extracted about the objects of interest from each of the images at substantially the same time in a field of view free from noise or less relevant features in the images. For example, where the object is human heart, and the images are ultrasound images, a contour of the heart is determined and extracted from each image, thereby producing two contours. These two contours are displayed, centered about a common value, in a different field of view from either of the two images. Superimposing the contours of objects from the image in a common field of view allows differences between the contours (and thus, the objects the contours represent) to be assessed visually and relatively quickly.

In general, in one aspect, the invention relates to a computer-implemented method. The method involves calculating a first centroid or center-of-mass of a first contour that is extracted from a first image that depicts a moving object as the object appeared at a first time. The method also involves calculating a second centroid or center-of-mass of a second contour that is extracted from a second image that depicts the object as the object appeared at a second time. The second image depicts the image in substantially the same plane as the first image. The method also involves displaying the first and second contours with the respective first and second centroids or centers-of-mass positioned at a common location.

In some embodiments, the first and second contours are extracted automatically by a contour-finding algorithm operating on the respective first and second images. The first and second images can be ultrasound images. In some embodiments, the moving object is a chamber of a human heart (e.g., a ventricle or ventricle wall), and the ultrasound images can be transgastric short axis views of the chamber.

In some embodiments, the method further involves associating a first identifying feature with the first contour and associating a second identifying feature with the second contour. The identifying features can be, for example, colors, line thickness, or types of lines. Some embodiments of the invention feature the first and second contours being associated with a left ventricle end diastolic area (LVEDA) or a left ventricle end systolic area (LVESA) of a human heart. The first and second contours, in some implementations, are displayed over a background pattern that is different from a first or second background pattern of the respective first or second images. An example of a background pattern is a solid color (e.g., black).

Some implementations involve a method where displaying the first and second images involves determining a value for the common location, transforming a first set of data representative of the first contour using the value of the common location, and illustrating the first contour based on the first set of transformed data. Similarly, a second set of data representative of the second contour is transformed using the value of the common location, and the second contour is illustrated based on the value of the transformed data. Illustrating the first and second contours can involve processing respective first and second cineloops to display the contours within a user interface window. In some embodiments, the method also involves displaying the first and second images in a first display window and displaying the first and second contours (superimposed) in a second display window.

In another aspect, the invention relates to a system. The system includes a computing apparatus that includes a processor, a memory, and an image capturing module. The system also includes a calculation module to calculate a first centroid or center-of-mass of a first contour extracted from a first image that depicts a moving object as the object appeared at a first time and to calculate a second centroid or center-of-mass of a second contour extracted from a second image that depicts the object as the object appeared at a second time. The second image depicts the object in substantially the same plane as the first image. The system also includes a first display window in communication with the processor to display images from the image capturing module and a second display window in communication with the processor and the calculation module to display the first and second contours of the object with the respective first and second centroids or centers-of-mass positioned at a common location.

In some embodiments, the system includes a transesophageal echocardiography probe (e.g., an imaging probe) in communication with the processor. The system can also include a transformation module to transform the first and second contours based on the value of the common location. In the first display window, the first and second images can be displayed side-by-side. Some implementations feature the first and second contour displayed superimposed in the second display window. The second display window can be superimposed over the first display window. The second display window can also be displayed in response to a command by or issued by a user. Such a command is available in response to a first cineloop and a second cineloop being populated with a respective first set of data associated with the first contour and a second set of data associated with the second contour.

In still another aspect, the invention relates to a computer program product, tangibly embodied in an information carrier. The computer program product includes instructions operable to cause data processing apparatus to calculate a first centroid or center-of-mass of a first contour extracted from a first image that depicts a moving object as the object appeared at a first time and to calculate a second centroid or center-of-mass of a second contour extracted from a second image that depicts the object as the object appeared at a second time. The second image depicts the object in substantially the same plane as the first image. The computer program product also includes instructions operable to cause data processing apparatus to display the first and second contours of the object with the respective first and second centroids or centers-of-mass positioned at a common location.

In some implementations, any of the above aspects can include all of the above features and/or advantages. These and other features will be more fully understood by reference to the following description and drawings, which are illustrative and not necessarily to scale.

DETAILED DESCRIPTION

Figure 1:
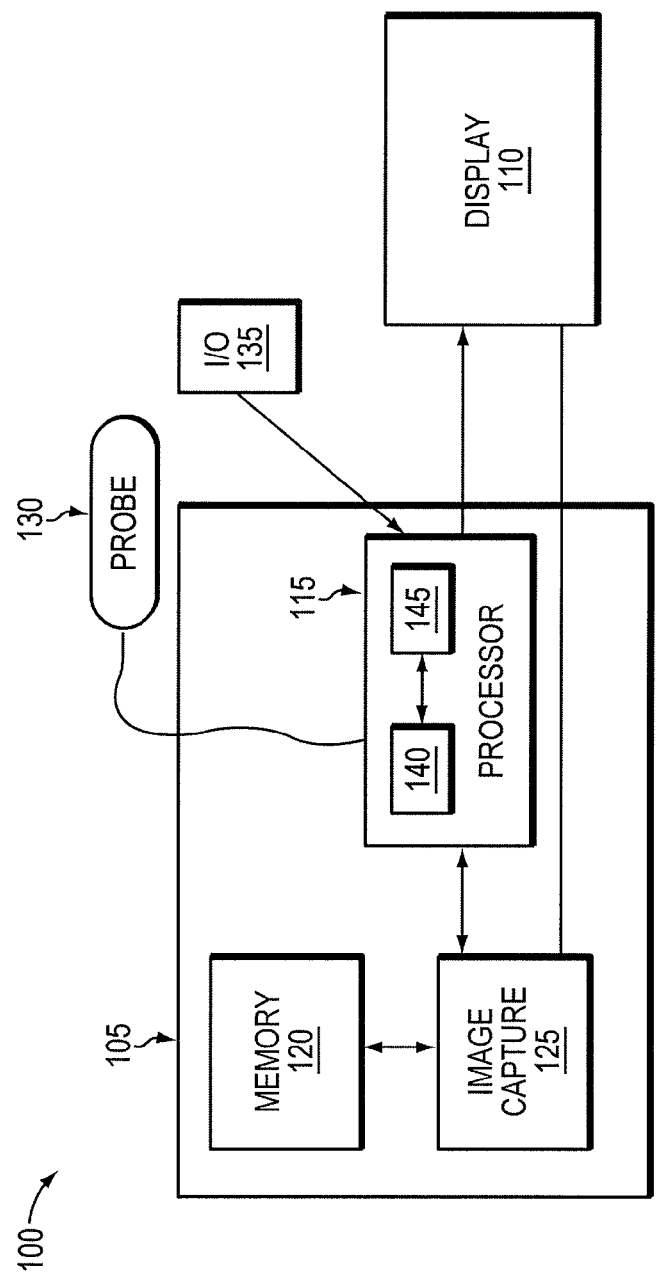
FIG. 1 depicts a block diagram of a system that embodies the invention.

FIG. 1 depicts a block diagram of a system 100 that embodies the invention. The system 100 includes a computing apparatus or computer 105 that is in communication with a display 110. The computer 105 includes a processor 115, a memory 120, and an image capturing module 125. The image capturing module 125 is in communication with the memory 120 and the display 110 for storing and displaying images (and data associated therewith), respectively.

The system includes an imaging probe 130 in communication with the processor 115. The imaging probe 130 can be an ultrasound probe. In some embodiments, the imaging probe is a transesophageal echocardiography probe. An example of a suitable transesophageal echocardiography probe is disclosed in U.S. patent application Ser. Nos. 10/997,059 and 10/996,816, each titled "Transesophageal Ultrasound Using a Narrow Probe" by Roth et al., filed Nov. 24, 2004, the entire contents of which are hereby incorporated herein by reference.

The system 100 includes an input device 135 in communication with the processor 115 for communicating information to the processor 115. For example, the input device 135 can include a mouse or pointer to identify and mark information displayed on the display 110, and the information can be used for further processing, as discussed in more detail below. The input device 135 can also control the processor 115, memory 120, image capturing module 125, and/or the display 110 by facilitating a user issuing commands the processor 115 carries out.

The image capturing module 125 collects and processes image data from the imaging probe 130 via the processor 115. For example, the image capturing module 125 captures still images and/or video images (e.g., sequences of still images at a particular shutter speed). The processor 115 can store information captured by the image capturing module 125 in the memory 120, e.g., as a data file, an image file, a cineloop file, or other type of suitable data structure. A cineloop file is a file containing multiple images, stored digitally as a sequence of individual frames. In some embodiments, the number of images or frames in a cineloop is pre-determined (e.g., 150 frames), but this is not required.

The processor 115 can include sub-modules or sub-routines for carrying out, implementing, or performing various operations and tasks. As illustrated, the processor 115 includes a calculation module 140 and a transformation module 145 in communication with the calculation module 140. The processor 115 utilizes the calculation module 140 and the transformation module 145 to facilitate display of image contours on the display 110, as discussed in more detail below.

The display 110 displays different types of information about the system 100. For example, the display 110 displays image data captured from the imaging probe 130 by the image capturing module 125. The display 110 also displays information calculated or determined by the processor 115, the calculation module 140, and/or the transformation module 145. The display 110 can also display information from the input device 135. In some embodiments, the display 110 displays a cursor, landmarks, and/or menus called or selected by the input device 135. In some embodiments, the display 110 features a user interface, e.g., a Windows-based user interface. Those of skill will appreciate other user interfaces suitable for carrying out the principles described herein.

Figure 2:
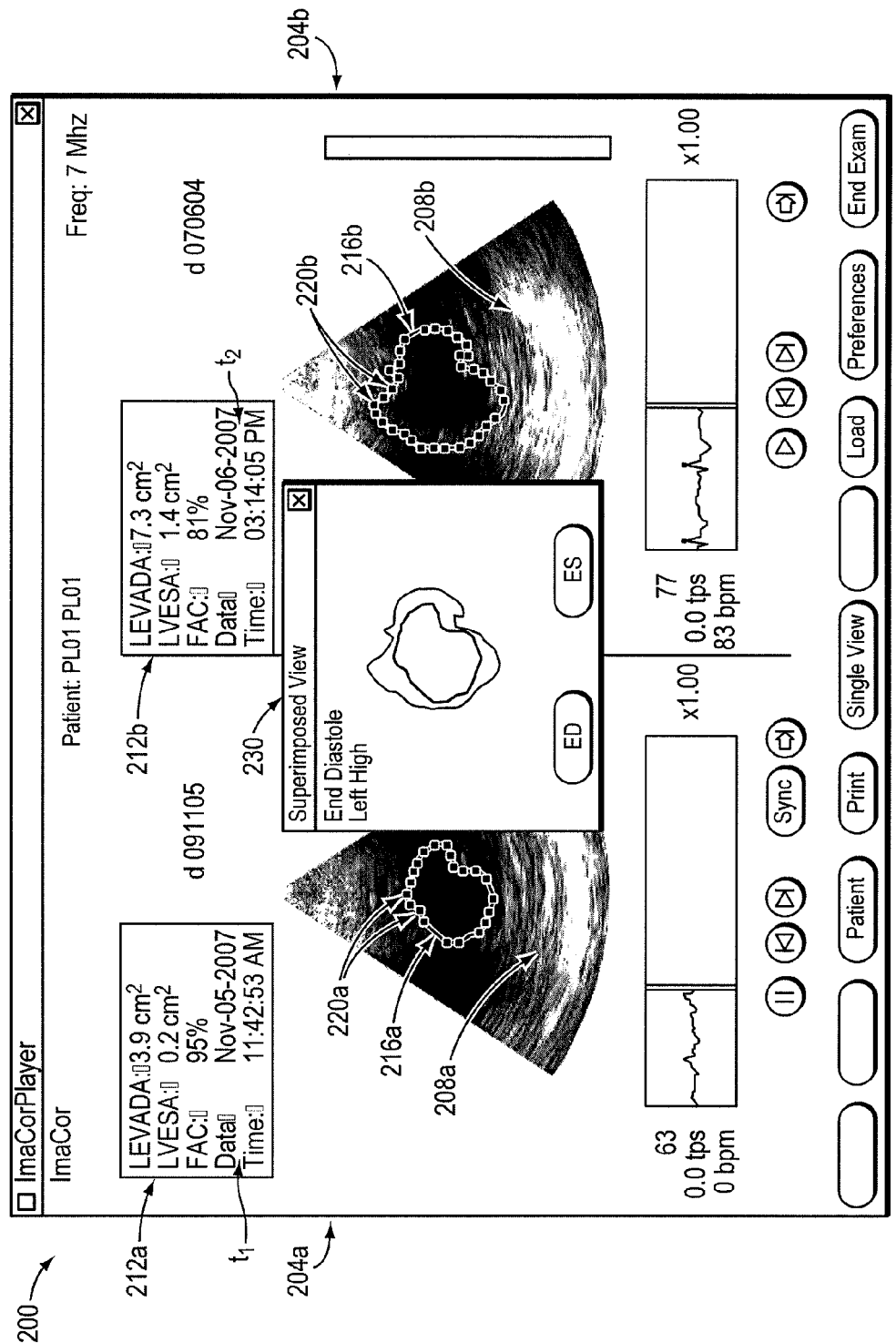
FIG. 2 is an exemplary display window illustrating images and superimposed contours of an object shown in the images.

FIG. 2 is an exemplary display window 200 illustrating image data and superimposed contours of an object within the images. In some embodiments, the window 200 is displayed, for example, on the display 110 of the system 100 of FIG. 1. The window 200 includes a first area 204a and a second area 204b. The first area 204a and the second area 204b are displayed side-by-side in the window 200. The first area 204a includes a first image 208a, and the second area 204b includes a second image 208b.

As illustrated, the first image 208a depicts a moving object (e.g., a patient's human heart) as the object appeared at a first time $t_1$. The first area 204a displays the time $t_1$ within the region 212a of the first area 204a. The time $t_1$ at which the first image 208a depicts the human heart is labeled "11:42:53 AM" on "Nov. 5, 2007" as shown in the first region 212a. The second image 208b depicts the moving object (e.g., the same human heart depicted in the first image 208a) as the object appeared at a second time $t_2$. The second area 204b displays the time $t_2$ within the region 212b of the second area 204b. The time $t_2$ at which the second image 208b depicts the human heart is labeled "03:14:05 PM" on "Nov. 6, 2007" as shown in the second region 212b. Though FIG. 2 is described with reference to a human heart, one of skill will appreciate that the concepts described herein apply to other types of images or images of other objects as well.

The first image 208a and the second image 208b represent a projection of the object in substantially the same plane, which allows, for example, meaningful comparison between the images. In some embodiments, an imaging probe (e.g., the imaging probe 130 of FIG. 1) emits a fan- or conical-shaped beam (not shown) such that the plane of the beam defines the image plane of the images 208a-208b. Where the imaging probe is aimed upwardly through the left ventricle of the human heart (e.g., by positioning the imaging probe in the fundus of a human stomach), the imaging probe can provide a trans-gastric short axis view of the heart represented in the images 208a-208b. The trans-gastric short axis view of the left ventricle is useful for monitoring the heart's operation because the view allows medical personnel to directly visualize the left ventricle, which is the main pumping chamber of the heart. Positioning the imaging probe in other locations, as would be apparent to one of skill, allows visualization of the majority of the relevant cardiac anatomy (e.g., other chambers of the heart, blood vessels, and chest cavity). The positioning of the imaging probe does not affect the operation of the principles herein since the images 208a-208b depict the object projected onto substantially the same image plane.

A comparison between the images of the human heart at time $t_1$ and time $t_2$ can provide valuable information, for example, to a healthcare professional such as a doctor. For example, the comparative information can be used to assess the efficacy or effectiveness of a course of treatment and/or to monitor the heart's reaction to administration of treatment. However, the first image 208a and the second image 208b include less relevant features (or even noise) associated with ultrasonic imaging and/or electromagnetic phenomena.

One way to effectively compare the first image 208a of the patient's heart with the second image of the patient's heart 208b is to determine a contour of the heart appearing in the first and second images 208a-208b. The first image 208a includes a first contour 216a that approximates the outline or contour of the patient's heart (or chamber or portion thereof), as the heart appeared at the time $t_1$ the first image 208a was captured. The first contour 216a includes a set of interconnected points 220a positioned relative to the first image 208a. The second image 208b includes a second contour 216b that approximates the outline or contour of the patient's heart, as the heart appeared at the time $t_2$ the second image was captured. Like the first contour 216a, the second contour 216b includes a set of interconnected points 220b positioned relative to the second image 208b.

The first set of points 220a is used to create or draw the first contour 216a, e.g., by connecting the points 220a to form a first closed polygon representative of the outline of the patient's heart in the first image 208a, at time $t_1$. The first closed polygon has $N_1$ vertices, each vertex representative of one of the points 220a. Similarly, the second set of points 220b is used to create or draw the second contour 216b, e.g., by connecting the points 220b to form a second closed polygon representative of the outline of the patient's heart in the second image 208, at time $t_2$. The second closed polygon has $N_2$ vertices, each vertex representative of one of the points 220b. In some embodiments, the number of points 220a used to extract the first contour 216a (e.g., $N_1$) is the same as the number of points 220b used to extract the second contour 216b ($N_2$), but this is not required.

In some embodiments, the location (and thus coordinate values) of the first and second sets of points 220a-220b are determined by a user. For example, an ultrasound technician or healthcare provider can use the input device 135 of the system 100 of FIG. 1 to identify the first and second sets of points 220a-220b (e.g., by "clicking" on the image to position the points). In some embodiments, the ultrasound technician manually connects the points 220a-220b within the respective first and second sets, e.g., using the input device 135 to draw lines between points or by allowing the user to drag a point to its location on the image. Alternatively, an algorithm can connect the points 220a-220b within the respective first and second sets, e.g., using a connection algorithm that draws lines (e.g., straight-line segments) between adjacent points until the algorithm generates a closed polygon where the first vertex $(x_1, y_1)$ is also the Nth vertex $(x_N, y_N)$.

In some embodiments, the need for an ultrasound technician or healthcare professional to determine of the sets of points 220a-220b that generates the first and second contours 216a-216b is eliminated by using an automated contour-finding algorithm operating on the respective first and second images 208a-208b. For example, an edge or feature detector can be applied to the first and second images 208a-208b determine sets of the respective contours 216a-216b, either before or after the first or second image 208a-208b is filtered or sub-sampled if such pre-processing steps occur. The algorithm can operate either by locating the set of points 220a-220b within the respective images 208a-208b and drawing the respective contours 216a-216b from the points 220a-220b, or, alternatively, by drawing the respective contours 216a-216b and locating/selecting points along the contours 216a-216b to populate the respective sets 220a-220b. A combination of these algorithms is also contemplated.

The sets of points 220a-220b are, in some embodiments, data structures that can be stored (e.g., in the memory 120 of the system 100 of FIG. 1). In some embodiments, the sets of points 220a-220b are associated with the respective images 208a-208b, e.g., as cineloop data. In some embodiments, a data extraction algorithm generates a separate data structure representative of the first and second contours 216a-216b based on the sets of points 220a-220b, and the data structure representative of the first and second contours 216a-216b is stored (e.g., rather than points 220a-220b themselves). According to any of the described examples, the first and second contours 216a-216b are extracted from the respective first and second images 208a-208b for subsequent processing.

After the contours 216a-216b have been extracted from the respective images 208a-208b, the centroid or center-of-mass (not shown) for each contour is calculated, as discussed in more detail below. The window 200 includes a second window 230. The second window 230 displays the first contour 216a and the second contour 216b with the respective centroids or centers-of-mass positioned/aligned at the common location. The second window 230 is discussed in more detail below with respect to FIG. 3. The second window 230 is superimposed over the first and second images 208a-208b in the window 200.

Figure 3:
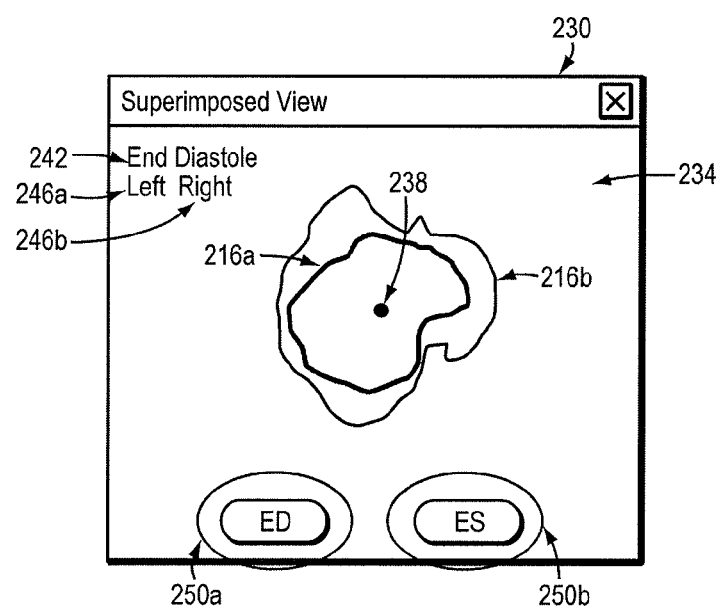
FIG. 3 is an enlarged view of the display window of FIG. 2, illustrating superimposed contours of the object.

FIG. 3 is an enlarged view of the display window 230 of FIG. 2, illustrating superimposed contours 216a-216b of the object. The window 230 includes a background 234 on which the contours 216a-216b are displayed. As illustrated, the background 234 is a solid color, e.g., black. Presenting the background 234 as a solid color provides greater contrast with the contours 216a-216b than the background (not shown) of the respective images 208a-208b. The greater contrast is due, in part, to the absence in the background 234 of the less relevant features present in the images 208a-208b. After the contours 216a-216b have been extracted from the respective images 208a-208b, the centroid or center-of-mass (not shown) of each contour 216a-216b is determined, as discussed in more detail with respect to FIGS. 5-6.

Within the window 230, the centroid or center-of-mass of the first contour 216a is positioned at a common location, illustrated as 238. The centroid or center-of-mass of the second contour 216b is also positioned at the common location 238. Aligning the centroids or centers-of-mass of the first and second contours 216a-216b allows the contours 216a-216b to be displayed superimposed relative to each other in the window 230. Superimposing the contours 216a-216b using the same location for the centroid or center-of-mass for each contour 216a-216b allows for quick visual comparison between the contours 216a-216b, and correspondingly, between the images 208a-208b of the moving object as it appeared at time $t_1$ and time $t_2$.

In some embodiments, the first contour 216a and/or the second contour 216b are transformed to a common scale. Examples of transformations include scale transformations, aspect transformations, skew transformations, translation transformations, rotational transformations, or any combination thereof of the contours 216a-216b. Some of these transformations fall into a category of transformations known as affine transformations.

The window 230 features a description of the view or plane represented by the contours 216a-216b. For example, as illustrated, the contours 216a-216b represent an end diastole transgastric short axis view ("TGSAV") of the left ventricle (or ventricular wall) of a moving heart, as indicated by the words "End Diastole" 242 in the window 230. The window 230 also includes an identifying characteristic or feature 246a associated with the first contour 216a. The feature 246a in window 230a indicates "Left" and the text is represented as a particular color that corresponds to a line color with which the first contour 216a is displayed. The "Left" designation refers to the relative position of the image 208a from which the contour 216a was extracted. Specifically, "Left" indicates that the contour 216a represents the image 208a in the first area 204a of the window 200 of FIG. 2 (i.e., the image on the left-side of the side-by-side display).

Similarly, the window includes an identifying characteristic or feature 246b associated with the second contour 216b. The feature 246b in window 230 indicates "Right" and a particular color (different from the color associated with feature 246a) that corresponds to a line color with which the second contour 216b is displayed in the window 230. The "Right" designation refers to the relative position of the image 208b from which the contour 216b was extracted; specifically, "Right" indicates that the contour 216b represents the image 208b in the second area 204b of the window 200 in FIG. 2.

In some embodiments, the features 246a-246b are not line color, but some other characteristic for visually distinguishing the respective contours 216a-216b and/or indicating a correspondence between the contour 216a-216b and the underlying image 208a-208b from which the respective contour 216a-216b was extracted. Examples of suitable identifying characteristics include line-type (e.g., dotted or dashed, of varying lengths and frequency) or line thickness. In another implementation, the contours 216a-216b can be distinguished using labeled arrows (not shown) pointing to the contour 216a or 216b that corresponds to the respective image 208a-208b.

The window 230 also includes a first button 250a and a second button 250b. The first button 250a is labeled "ED," which is representative of "End Diastole." The second button 250b is labeled "ES," which is representative of "End Systole." A user (not shown) can toggle between the end diastole view and the end systole view of the heart by selecting the first button 250a or the second button 250b, respectively. In some embodiments, if sufficient data does not exist to populate the window 230 for a particular view (e.g., the end systole view), the respective button (e.g., the second button 250b) will not be available for user selection. The availability of the first or second button 250a-250b for user selection indicates sufficient data exists to superimpose the contours 216a-216b of the end diastole view or the contours (not shown) of the end systole view in the window.

In some embodiments, the first and second contours 216a-216b are extracted from a sequence or series of images, rather than from a single image 208a-208b. Accordingly, the first and second contours 216a-216b can change shape and evolve over time, appearing as an animation. For each such evolution or change to the contours 216a-216b, the centroid or center-of-mass is calculated and positioned at the common location 238. In such an embodiment, the first and second contours 216a-216b will give the appearance of moving (e.g., via animation or time-evolution) in the window 230, while the centroid or center-of-mass of each moving centroid appears at the same location 238 in the window. Such embodiments facilitate comparison between moving images of the object and permit assessment of the time evolution of the object, e.g., to visually determine a rate of volumetric change in the ventricle of a heart over a period of time $T_1$ relative to a second period of time $T_2$.

Figure 4:
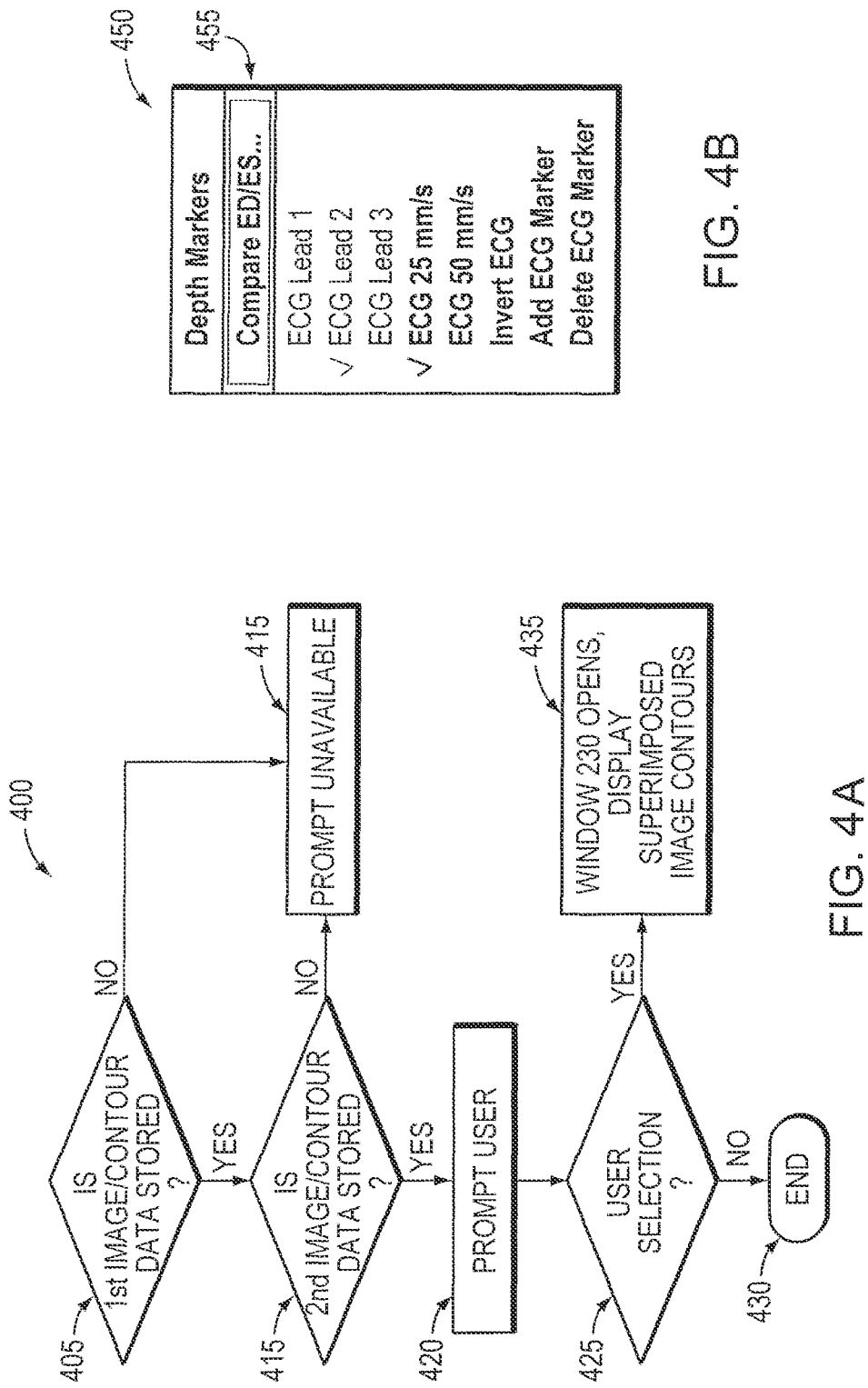
FIG. 4A is a flow chart illustrating an exemplary process by which the display window of FIG. 3 is displayed.
FIG. 4B is an exemplary user interface of a prompt that embodies and illustrates the process of FIG. 4A.

FIG. 4A is a flow chart 400 illustrating an exemplary process by which the display window 230 of FIG. 3 is displayed. In general, the window 230 of FIG. 3 is displayed in response to a user command or directive via, e.g., a user menu or prompt. The window 230 is populated with contours (e.g., contours 216a-216b) extracted from images (e.g., images 208a-208b). To illustrate the contours 216a-216b in the window, sufficient data about the extracted contour 216a-216b is used to control the display (e.g., data associated with the contour is accessed by a display algorithm to illustrate the contour on the background 234 in the window 230).

At step 405, the process queries and determines whether image data and contour data exists for a first image and contour, for example, as the currently displayed cineloop or as a previously-displayed and stored cineloop. If image and/or contour data for the first image and/or contour does not exist, the prompt for displaying the window 230 is unavailable (step 410). If, on the other hand, the first image and/or contour data does exist, the process (step 415) then queries and determines whether image data and contour data for a second image and contour exists. If image and/or contour data for the second image and/or contour does not exist, the prompt for displaying the window 230 is unavailable (step 410). If data representative of both the first and second images and the first and second contours exists, the user prompt is available (step 420).

When the user prompt is available (step 420), the user can select whether to open the window 230 (step 425) by, for example, issuing a command through an input device such as the input device 135 of the system 100 of FIG. 1. If the user does not issue a command, query or request (step 425), the process is terminated (step 430), and the window 230 is not displayed. If the user, in response to prompt, opts to open the window 230 (step 425), the user indicates the preference, and the window 230 opens (step 435). Upon the window opening, the data (e.g., cineloop data) associated with the first and second contours (e.g., contours 216a-216b) is loaded and displayed in the window 230. When the window 230 opens, the window is superimposed over the existing display (e.g., over the window 200 of FIG. 2).

FIG. 4B is an exemplary user interface 450 of a prompt that embodies the process of FIG. 4A. The user interface 450 includes a command 455 called "Compare ED/ES" that corresponds to step 420 of the process of FIG. 4A. "Compare" is associated with a visual comparison between image contours, while "ED" refers to the end diastole view and "ES" refers to the end systole view, as discussed above. In some embodiments, the user interface 450 appears in response to action by the user (e.g., a right mouse-click). The user interface 450 can also appear automatically in response to the existence of data associated with the first and second images and first and second contours. Similarly, in the absence of data associated with either the first or second image or first or second contour (e.g., step 410 of FIG. 4A), the command 455 is unavailable for selection by the user.

Figure 5:
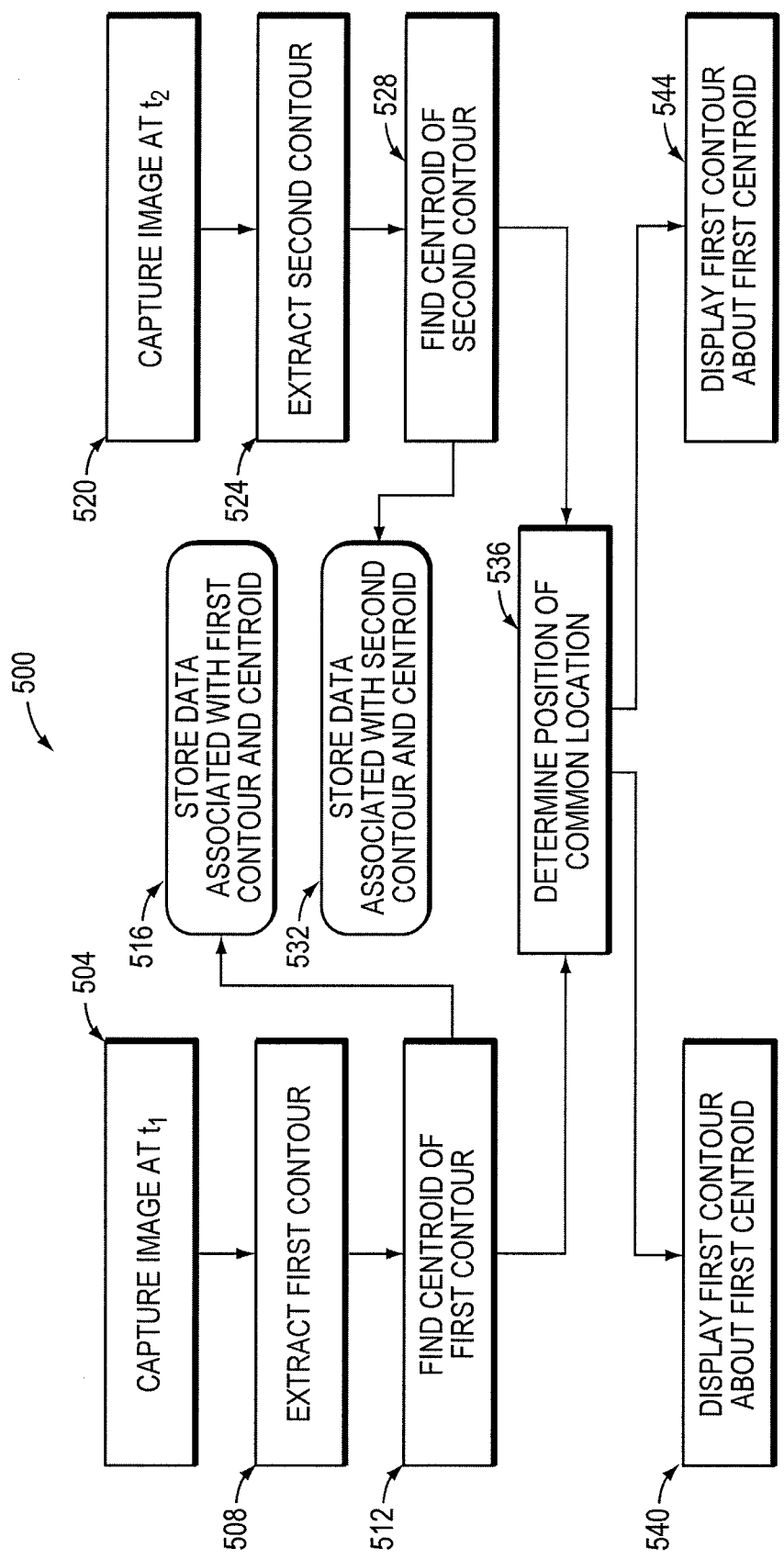
FIG. 5 is a flow chart illustrating an exemplary method for displaying superimposed image contours.

FIG. 5 is a flow chart 500 illustrating an exemplary method for displaying superimposed image contours. The method involves capturing a first image at a first time $t_1$ (step 504). As discussed above, a first contour of an object of interest (e.g., a moving object, captured as the object appeared at time $t_1$) is extracted from the first image (step 508). After the contour is extracted, the centroid or center-of-mass of the first contour is determined or calculated (step 512). Optionally, data associated with the centroid or center-of-mass and the first contour is stored in a computer memory (step 516).

The centroid or center-of-mass of the first contour is determined using a centroid-finding or center-finding algorithm applied to the contour. As discussed above, the first contour includes a set of points of the image. In some embodiments, the points are pixel addresses or values in a pixel grid, and as such, are represented as an ordered pair or coordinate value $(x_i, y_i)$. The contour forms a closed polygon of connected vertices where each vertex is a point or ordered coordinate pair in the set of points that define the contour.

Various algorithms for determining the centroid of a closed polygon can be used. In some embodiments, the area of the polygon (e.g., the first contour) is calculated, and the area is used to determine the coordinates of the centroid or center-of-mass (e.g., by treating the polygon as a plate of uniform mass density).

The area, A, of a non-overlapping, closed polygon that is defined by N vertices $(x_i, y_i)$, is governed by Equation 1, below. In Equation 1, the Nth or notional vertex (e.g., $(x_N, y_N)$) is set equal to the zeroth vertex (e.g., $(x_0, y_0)$), indicating a closed polygon.

$$A = \frac{1}{2}\sum_{i=0}^{N-1} x_i y_{i+1} - x_{i+1} y_i \qquad \text{Equation 1}$$

After the area, A, of the contour has been determined, the x and y coordinates of the centroid or center-of-mass ($C_x$, $C_y$) are determined using Equations 2A and 2B, where "A" in Equations 2A and 2B are determined from Equation 1. Like Equation 1, the Nth or notional vertex (e.g., $(x_N, y_N)$) is set equal to the zeroth vertex (e.g., $(x_0, y_0)$).

$$C_x = \frac{1}{6A}\sum_{i=0}^{N-1} (x_i + x_{i+1})(x_i y_{i+1} - x_{i+1} y_i) \qquad \text{Equation 2A}$$

$$C_y = \frac{1}{6A}\sum_{i=0}^{N-1} (y_i + y_{i+1})(x_i y_{i+1} - x_{i+1} y_i) \qquad \text{Equation 2B}$$

Mathematically, a centroid (or barycenter) of an object in an n-dimensional space represents the intersection of all hyperplanes that divide the object into two parts of equal moment about the hyperplane. The centroid is sometimes referred to as the "average" of all points in the object. In situations in which the object has a uniform density, the location of the centroid coincides with the object's center-of-mass. As discussed herein, the "centroid" and "center-of-mass" are used interchangeably since the calculation involves determination of a centroid of a polygonal shape that is deemed or assumed to have uniform mass density.

In some embodiments, the centroid or center-of-mass is calculated using the so-called "triangle method." According to the triangle method, the polygon is partitioned into triangles (or "triangulated"), each having three vertices: ($x_1$, $y_1$), ($x_2$, $y_2$), and ($x_3$, $y_3$). The centroid of each triangle is the average of the vertices, so the coordinate of the centroid ($x_c$, $y_c$) is given by Equation 3:

$$(x_c, y_c) = \left(\left(\frac{x_1 + x_2 + x_3}{3}\right), \left(\frac{y_1 + y_2 + y_3}{3}\right)\right) \qquad \text{Equation 3}$$

The coordinate of the centroid ($x_c$, $y_c$) of each of the triangles into which the polygon was partitioned is calculated. The coordinates of the centroids are added or summed, weighted by the area of each triangle. Specifically, the abscissa ($x_c$) values are summed and weighted to determine an abscissa value for the centroid ($x_c$), and the ordinate ($y_c$) values are summed and weighted to determine an ordinate value for the centroid ($y_c$). The centroid's abscissa and ordinate values are then normalized using the total polygonal area to determine the coordinate of the centroid ($C_x$, $C_y$). In some embodiments, the coordinate of the centroid is rounded to the nearest pixel value for each of the abscissa and/or ordinate. The coordinate can also be rounded to the nearest sub-pixel value where pixels are partitioned (e.g., in quarter-pixel increments). In some embodiments, the coordinate of the centroid is a real-valued number and is not rounded to the nearest integer pixel.

The method involves capturing a second image at a second time $t_2$ (step 520). A second contour is extracted from the second image (step 524) as discussed above. Similarly, a second centroid of the second contour is calculated and determined (step 528) (e.g., using one of the centroid-finding techniques discussed above). Optionally, data associated with the second contour and centroid can be stored (step 532).

In some embodiments, the steps of the process can be completed in a different order. For example, extracting the first contour (step 508) does not necessarily precede capturing the second image at the second time $t_2$. Specifically, the contours can be extracted (step 508 and 524) near the same time, after both images have been captured (steps 504 and 520).

After the centroids for the first and second contours have been determined, the position of a common location for displaying the contours is determined (step 536). In some embodiments, the common location is selected to be an integer pixel coordinate or sub-pixel coordinate in a pixel grid that will be displayed in a window (e.g., the window 230 of FIG. 2). The common location can also be a real-valued coordinate pair. The common location is used as a reference point or reference value for both the first contour and the second contour. As discussed above, when the first and second contours are displayed in the window, the respective first and second centroids (or centers-of-mass) are positioned at the common location. The first and second contours are redrawn or illustrated in the window centered about the common location since the respective centroids are aligned at the central location (steps 540 and 544). In some embodiments, the centroids are assigned a value that is the same as the value of the common location, and the values of the points that define the contour are transformed based on the value of the common location.

Figure 6:
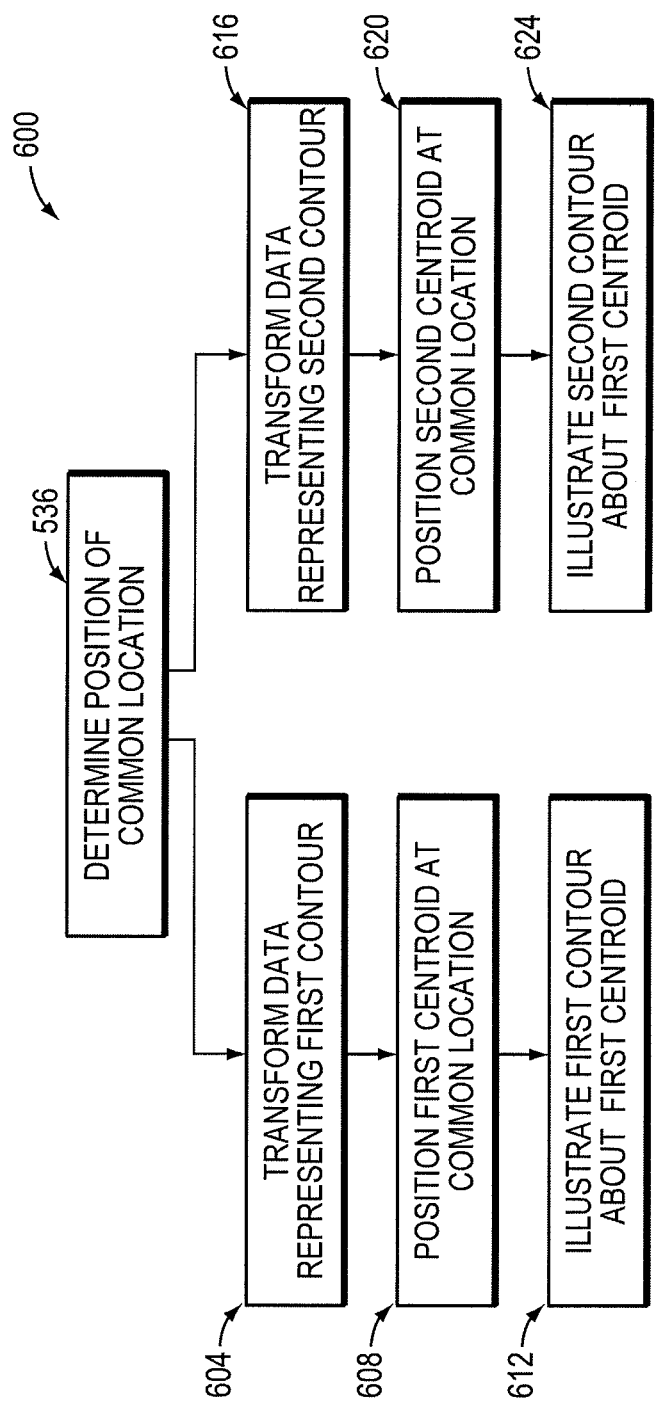
FIG. 6 is a flow chart illustrating a process for displaying image contours with a common centroid or center-of-mass.

FIG. 6 is a flow chart 600 illustrating a process for displaying image contours with a common centroid or center-of-mass. The process involves determining the position of the common location (step 536 of FIG. 5). After the position of the common location has been determined, data representative of the first contour is transformed based on the coordinate value of the common location (step 604). In some embodiments, each point in the set of points that define the contour are associated with a vector that identifies a distance and a direction of the particular point relative to the centroid. When the centroid ($C_x$, $C_y$) is positioned at the common location ($x_{CL}$, $y_{CL}$), the centroid undergoes a linear transformation L ($x_{CL}$-$C_x$, $y_{CL}$-$C_y$) that relates the common location to the centroid. The linear transformation L can be applied, e.g., via matrix transformation, to each of the vectors representative of the points defining the first contour. In some embodiments, more complicated transformations can be applied to the set of vectors, e.g., scale transformations, rotational transformations, skew transformations, aspect transformations, or combinations of these. The transformed contour can be stored for later use, or subsequently processed and/or displayed without storage. Other representations of the points that define a contour (e.g., other than a vector representation) will be apparent to one of skill.

After the vectors associated with the points defining the first contour have been transformed, the first centroid is positioned at the common location (step 608), and the first contour is illustrated, displayed, drawn, or redrawn with the first centroid at the common location (step 612). Specifically, the transformed data is used to illustrate the contour in the window about the common location (e.g., rather than using the nontransformed data).

A similar operation occurs with respect to the second contour. Specifically, data associated with or representative of the second contour is transformed based on information about the common location (step 616). The second centroid is positioned at the common location (step 620), and the second contour is illustrated, displayed, drawn, or redrawn with the second centroid at the common location (step 624), based on the transformed data. In this way, the image contours can be displayed in a common field of view (e.g., against a solid-color background) in a window for quick assessment and comparison. In some embodiments, illustrating the first and second contours (steps 612 and 624) involves processing a cineloop associated with the respective contours. The cineloops can have the transformation data stored or associated therewith, or the transformation calculation can be implemented on-the-fly as the contour is illustrated.

In some embodiments, the transformation steps (steps 604 and 616) are carried out by a transformation module (e.g., the transformation module 145 of FIG. 1), based on the value of the common location.

The above-described techniques can be implemented in digital electronic circuitry, or in computer hardware, firmware, software, or in combinations of them. The implementation can be as a computer program product, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit ("IC"), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges ("PBX"). In any of these cases, implementation may be achieved either by writing applications that are native to the chosen platform, or by interfacing the platform to one or more external application engines.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communications, e.g., a communications network. Examples of communications networks, also referred to as communications channels, include a local area network ("LAN") and a wide area network ("WAN"), e.g., the Internet, and include both wired and wireless networks. In some examples, communications networks can feature virtual networks or sub-networks such as a virtual local area network ("VLAN"). Unless clearly indicated otherwise, communications networks can also include all or a portion of the PSTN, for example, a portion owned by a specific carrier.

The computing system can include clients and servers. A client and server are generally remote from each other and typically interact through a communications network. The relationship of client and server arises by virtue of computer programs running on the respective computers and having a client-server relationship to each other.

Various embodiments are depicted as in communication or connected by one or more communication paths. A communication path is not limited to a particular medium of transferring data. Information can be transmitted over a communication path using electrical, optical, acoustical, physical, thermal signals, or any combination thereof. A communication path can include multiple communication channels, for example, multiplexed channels of the same or varying capacities for data flow.

Multiple user inputs can be used to configure parameters of the depicted user interface features. Examples of such inputs include buttons, radio buttons, icons, check boxes, combo boxes, menus, text boxes, tooltips, toggle switches, buttons, scroll bars, toolbars, status bars, windows, or other suitable icons or widgets associated with user interfaces for allowing a user to communicate with and/or provide data to any of the modules or systems described herein. In some embodiments, a touchscreen is used to facilitate an interface or interaction between components hereof and the user.

While the invention has been particularly shown and described with reference to specific embodiments, it should be understood by those skilled in the art that various changes in form and detail may be made therein without departing from the spirit and scope of the invention as defined by the appended claims.

What is claimed is:

1. A computer-implemented method comprising:
    calculating a first centroid or center-of-mass of a first contour extracted from a first image depicting a moving object as the object appeared at a first time;
    calculating a second centroid or center-of-mass of a second contour extracted from a second image depicting the object as the object appeared at a second time, the second image depicting the object in substantially the same plane as the first image; and
    displaying the first and second contours superimposed on a single display, with the respective first and second centroids or centers-of-mass positioned at a common location, wherein the displaying step includes displaying at least one identifying characteristic or feature for visually distinguishing the first contour from the second contour,
    wherein the step of calculating a first centroid or center-of-mass of the first contour and the step of calculating a second centroid or center-of-mass of the second contour each comprise the steps of:
    partitioned a polygon into a plurality of triangles each having three vertices: $(x_1, y_1)$, $(x_2, y_2)$, and $(x_3, y_3)$;
    computing a centroid $(x_c, y_c)$ of each triangle based on the equation $$(x_c, y_c) = \left( \left( \frac{x_1 + x_2 + x_3}{3} \right), \left( \frac{y_1 + y_2 + y_3}{3} \right) \right);$$

and
    summing the coordinates of each of the centroids, weighted by the area of each triangle.

2. A computer-implemented method comprising:
    calculating a first centroid or center-of-mass of a first contour extracted from a first image depicting a moving object as the object appeared at a first time;
    calculating a second centroid or center-of-mass of a second contour extracted from a second image depicting the object as the object appeared at a second time, the second image depicting the object in substantially the same plane as the first image; and
    displaying the first and second contours superimposed on a single display, with the respective first and second centroids or centers-of-mass positioned at a common location, wherein the displaying step includes displaying at least one identifying characteristic or feature for visually distinguishing the first contour from the second contour, wherein the step of calculating a first centroid or center-of-mass of the first contour and the step of calculating a second centroid or center-of-mass of the second contour each comprise the steps of:
determining x and y coordinates of the centroid or center-of-mass ($C_x$, $C_y$) using the equations $$C_x = \frac{1}{6A}\sum_{i=0}^{N-1}(x_i + x_{i+1})(x_i y_{i+1} - x_{i+1} y_i)$$

$$C_y = \frac{1}{6A}\sum_{i=0}^{N-1}(y_i + y_{i+1})(x_i y_{i+1} - x_{i+1} y_i)$$

where "A" in the equations for $C_x$ and $C_y$ are determined for a non-overlapping, closed polygon that is defined by N vertices ($x_i$, $y_i$), based on the equation $$A = \frac{1}{2}\sum_{i=0}^{N-1} x_i y_{i+1} - x_{i+1} y_i$$

where the Nth or notional vertex ($x_N$, $y_N$) is set equal to the zeroth vertex ($x_0$, $y_0$), indicating a closed polygon.

3. A system comprising:
a computing apparatus comprising a processor, a memory, and an image capturing module;
a calculation module to calculate a first centroid or center-of-mass of a first contour extracted from a first image depicting a moving object as the object appeared at a first time and to calculate a second centroid or center-of-mass of a second contour extracted from a second image depicting the object as the object appeared at a second time, the second image depicting the object in substantially the same plane as the first image;
a first display window in communication with the processor to display images from the image capturing module; and
a second display window in communication with the processor and the calculation module to display the first contour of the object superimposed with the second contour of the object, with the respective first and second centroids or centers-of-mass positioned at a common location, wherein at least one identifying characteristic or feature for visually distinguishing the first contour from the second contour is displayed in the second display window,
wherein the first centroid or center-of-mass of the first contour and the second centroid or center-of-mass of the second contour are each calculated by: partitioned a polygon into a plurality of triangles each having three vertices: ($x_1$, $y_1$), ($x_2$, $y_2$), and ($x_3$, $y_3$);
computing a centroid ($x_c$, $y_c$) of each triangle based on the equation $$(x_c, y_c) = \left(\left(\frac{x_1 + x_2 + x_3}{3}\right), \left(\frac{y_1 + y_2 + y_3}{3}\right)\right);$$

and
summing the coordinates of each of the centroids, weighted by the area of each triangle.

4. A system comprising:
a computing apparatus comprising a processor, a memory, and an image capturing module;
a calculation module to calculate a first centroid or center-of-mass of a first contour extracted from a first image depicting a moving object as the object appeared at a first time and to calculate a second centroid or center-of-mass of a second contour extracted from a second image depicting the object as the object appeared at a second time, the second image depicting the object in substantially the same plane as the first image;
a first display window in communication with the processor to display images from the image capturing module; and
a second display window in communication with the processor and the calculation module to display the first contour of the object superimposed with the second contour of the object, with the respective first and second centroids or centers-of-mass positioned at a common location, wherein at least one identifying characteristic or feature for visually distinguishing the first contour from the second contour is displayed in the second display window,
wherein the first centroid or center-of-mass of the first contour and the second centroid or center-of-mass of the second contour are each calculated by:
determining x and y coordinates of the centroid or center-of-mass ($C_x$, $C_y$) using the equations $$C_x = \frac{1}{6A}\sum_{i=0}^{N-1}(x_i + x_{i+1})(x_i y_{i+1} - x_{i+1} y_i)$$

$$C_y = \frac{1}{6A}\sum_{i=0}^{N-1}(y_i + y_{i+1})(x_i y_{i+1} - x_{i+1} y_i)$$

where "A" in the equations for $C_x$ and $C_y$ are determined for a non-overlapping, closed polygon that is defined by N vertices ($x_i$, $y_i$), based on the equation $$A = \frac{1}{2}\sum_{i=0}^{N-1} x_i y_{i+1} - x_{i+1} y_i$$

where the Nth or notional vertex ($x_N$, $y_N$) is set equal to the zeroth vertex ($x_0$, $y_0$), indicating a closed polygon.

* * * * *